(12) United States Patent
Zhdanov et al.

(10) Patent No.: US 9,322,910 B2
(45) Date of Patent: Apr. 26, 2016

(54) METHOD OF REAL TIME SUBSURFACE IMAGING USING ELECTROMAGNETIC DATA ACQUIRED FROM MOVING PLATFORMS

(75) Inventors: Michael S. Zhdanov, Holladay, UT (US); Glenn A. Wilson, Holladay, UT (US); Leif H. Cox, Butte, MT (US)

(73) Assignee: TechnoImaging, LLC, Salt Lake City, UT (US)

( * ) Notice: Subject to any disclaimer, the term of this patent is extended or adjusted under 35 U.S.C. 154(b) by 864 days.

(21) Appl. No.: 13/488,256

(22) Filed: Jun. 4, 2012

(65) Prior Publication Data

US 2013/0018585 A1    Jan. 17, 2013

Related U.S. Application Data

(60) Provisional application No. 61/508,504, filed on Jul. 15, 2011.

(51) Int. Cl.
*G01S 13/89* (2006.01)
*G01V 3/08* (2006.01)
(Continued)

(52) U.S. Cl.
CPC .................. *G01S 13/89* (2013.01); *G01V 3/083* (2013.01); *G01V 3/15* (2013.01); *G01V 3/16* (2013.01)

(58) Field of Classification Search
CPC ..... G01S 13/89; G01S 13/885; G01S 13/887; G01S 13/888; G01V 3/083; G01V 3/16; G01V 3/15; G01V 3/00; G01V 3/08; G01V 3/165; G01V 3/18; G01V 3/38; G01V 2003/084; G01V 2003/085; G01V 2003/086
See application file for complete search history.

(56) References Cited

U.S. PATENT DOCUMENTS

| 2,794,949 A | 6/1957 | Hedstrom et al. |
| 3,214,616 A | 10/1965 | Way et al. |

(Continued)

FOREIGN PATENT DOCUMENTS

| GB | 1294484 | 10/1972 |
| WO | WO 2006/134329 | 12/2006 |

(Continued)

OTHER PUBLICATIONS

U.S. Appl. No. 60/868,905, filed Dec. 6, 2006, Velikhov et al.

(Continued)

*Primary Examiner* — Manuel L Barbee
(74) *Attorney, Agent, or Firm* — Workman Nydegger

(57) ABSTRACT

A method for the real time volume imaging of geological structures and/or man-made objects having electrical conductivity is described, using electromagnetic (EM) sources and/or EM sensors mounted from at least one moving platform. The EM sources may include natural EM sources and/or man-made inductive sources and/or man-made galvanic sources. The EM sensors may measure at least one component of the EM field at the at least one sensor position. The EM fields measured for each combination of EM source and EM sensor may be volume imaged in real time using a moving sensitivity domain that captures the finite spatial sensitivity of each combination of EM sources and EM sensors. At least one desired property, such as conductivity, dielectric permittivity and/or induced polarization parameters, may be derived from the volume image, providing a reconstruction or classification of the physical properties of the geological structures and/or man-made objects.

22 Claims, 14 Drawing Sheets

(51) Int. Cl.
*G01V 3/15* (2006.01)
*G01V 3/16* (2006.01)

(56) References Cited

U.S. PATENT DOCUMENTS

| | | | |
|---|---|---|---|
| 3,521,153 | A | 7/1970 | Moss |
| 3,887,923 | A | 6/1975 | Hendrix |
| 4,814,711 | A | 3/1989 | Olsen et al. |
| 5,053,783 | A | 10/1991 | Papadopoulos |
| 5,175,500 | A | 12/1992 | McNeill |
| 5,610,523 | A * | 3/1997 | Elliot ............... 324/330 |
| 5,673,050 | A * | 9/1997 | Moussally et al. ........ 342/22 |
| 5,770,945 | A | 6/1998 | Constable |
| 6,191,587 | B1 | 2/2001 | Fox |
| 6,253,100 | B1 | 6/2001 | Zhdanov |
| 6,603,313 | B1 | 8/2003 | Srnka |
| 6,628,119 | B1 | 9/2003 | Eidesmo et al. |
| 6,677,756 | B2 | 1/2004 | Fanini et al. |
| 6,879,735 | B1 | 4/2005 | Portniaguine et al. |
| 6,900,640 | B2 | 5/2005 | Fanini et al. |
| 7,126,338 | B2 | 10/2006 | MacGregor et al. |
| 7,176,680 | B1 | 2/2007 | Veryaskin |
| 7,365,544 | B2 * | 4/2008 | McCracken et al. ........ 324/330 |
| 7,550,969 | B2 | 6/2009 | Zhdanov |
| 7,969,152 | B2 | 6/2011 | Velikhov et al. |
| 8,429,582 | B1 | 4/2013 | Lai et al. |
| 8,520,467 | B2 | 8/2013 | Liu et al. |
| 8,564,296 | B2 | 10/2013 | Zhdanov et al. |
| 8,624,969 | B2 | 1/2014 | Zhdanov |
| 9,110,183 | B2 | 8/2015 | Zhdanov |
| 2004/0080315 | A1 | 4/2004 | Beevor et al. |
| 2007/0097788 | A1 | 5/2007 | Tang et al. |
| 2008/0136420 | A1 | 6/2008 | Velikhov et al. |
| 2008/0270035 | A1 | 10/2008 | Ozdemir et al. |
| 2009/0119040 | A1 | 5/2009 | Zhdanov |
| 2009/0216451 | A1 | 8/2009 | Barnes |
| 2009/0284258 | A1 * | 11/2009 | Morrison et al. ........ 324/330 |
| 2010/0039888 | A1 | 2/2010 | Ozdemir et al. |
| 2010/0172208 | A1 | 7/2010 | Belani et al. |
| 2010/0176813 | A1 * | 7/2010 | Simon ............... 324/339 |
| 2011/0144472 | A1 | 6/2011 | Zhdanov |
| 2011/0283789 | A1 | 11/2011 | Veryaskin |
| 2013/0018588 | A1 | 1/2013 | Zhdanov et al. |
| 2013/0253874 | A1 | 9/2013 | Zhdanov |

FOREIGN PATENT DOCUMENTS

| WO | WO 2008/070200 | 6/2008 |
|---|---|---|
| WO | WO 2008/092205 | 8/2008 |
| WO | WO 2010/088525 | 8/2010 |
| WO | WO 2012/018505 | 2/2012 |

OTHER PUBLICATIONS

U.S. Appl. No. 61/148,946, filed Jan. 31, 2009, Velikhov et al.
U.S. Appl. No. 61/285,909, filed Dec. 11, 2009, Zhdanov.
U.S. Appl. No. 61/369,985, filed Aug. 2, 2010, Zhdanov.
U.S. Appl. No. 61/506,538, filed Jul. 11, 2011, Zhdanov et al.
U.S. Appl. No. 61/508,504, filed Jul. 15, 2011, Zhdanov et al.
U.S. Appl. No. 61/535,590, filed Sep. 16, 2011, Zhdanov.
U.S. Appl. No. 61/541,722, filed Sep. 30, 2011, Zhdanov.
U.S. Appl. No. 14/828,182, filed Aug. 17, 2015, Zhdanov.
Constable, S.C. 1990, Marine electromagnetic induction studies: Surveys in Geophysics, 11, pp. 303-327.
Guerin, R., Tabbagh, A., and Andrieux, P., 1994, Field and/or resistivity mapping in MT-VLF and implications for data processing: Geophysics, 59, 1695-1712.
Michael S. Zhdanov et al.: "Fast 3D Imaging from a Single Borehole Using Tensor Induction Logging Data", Society of Petrophysicists and Well-Log Analysts, vol. 45, No. 2, Apr. 2004, pp. 167-177, XP002663172.
Alexander Gribenko and Michael Zhdanov: "Regularized integral-equation based inversion of tensor induction logging data in three-dimensional formations", Society of Exploration Geophysicists, ISSN: 1052-3812, DOI: doi: 10.1190/1.2792470.
Krieghauser et al—Improved shale sand interpretation in highly deviated and horizontal wells using multi-component induction log data: 42st Annual LoggingSymposium, SPWLA, Transactions, paper S and An efficient and accurate pseudo 2-D inversion scheme for multi component induction log data: 71st Annual 25 International Meeting, SEG, Expanded Abstracts, 37638.
T. Furukawa and MS. Zhdanov, Two-Dimensional Time Domain Electromagnetic Migration Using Integral Transformation, Society of Exploration Geophysicists, 2007, 5 pages.
Zhdanov, Geophysical Inverse Theory and Regularization Problems, Chapter 7, Integral Representations in Inversion of Gravity and Magnetic Data, pp. 178-198, Elsevier, 2002, online version available at: http://app.knovel.com/hotlink/toc/id:kpGITRPOOR/geophysical-inverse-theory.
Zhdanov, M., "Geophysical Inverse Theory and Regularization Problem", *Methods in Geochemistry and Geophysics*, 36, 2002, pp. 11, 14, 29, 30, 45, 78, 162, 164, 197, 535.
U.S. Appl. No. 11/676,936, Apr. 1, 2010, Office Action.
U.S. Appl. No. 11/676,936, Feb. 23, 2011, Office Action.
U.S. Appl. No. 11/676,936, Mar. 23, 2011, Notice of Allowance.
U.S. Appl. No. 12/879,399, Feb. 27, 2014, Office Action.
U.S. Appl. No. 13/183,680, Sep. 5, 2013, Notice of Allowance.
U.S. Appl. No. 13/488,247, Feb. 26, 2014, Office Action.
U.S. Appl. No. 13/617,963, Apr. 16, 2015, Office Action.
U.S. Appl. No. 13/617,963, Dec. 4, 2015, Office Action.
U.S. Appl. No. 14/828,182, Nov. 18, 2015, Office Action.

* cited by examiner

Resistivity model after 2 survey lines

Resistivity model
after 4 survey lines

Resistivity model after 6 survey lines

Resistivity model after 8 survey lines

METHOD OF REAL TIME SUBSURFACE IMAGING USING ELECTROMAGNETIC DATA ACQUIRED FROM MOVING PLATFORMS

CROSS-REFERENCE TO RELATED APPLICATIONS/PUBLICATIONS

This application claims the benefit of U.S. Provisional Application No. 61/508,504, filed Jul. 15, 2011, which is incorporated herein by reference in its entirety.

This application hereby incorporates the following publication by reference in its entirety: Zhdanov, M. S., 2009, Geophysical electromagnetic theory and methods: Elsevier, Amsterdam.

BACKGROUND OF THE INVENTION

1. The Field of the Invention

The present disclosure relates in general to real time 3D subsurface imaging of electrical conductivity using devices with electromagnetic (EM) sources and/or EM sensors mounted on at least one moving platform to generate EM data.

2. The Related Technology

Electromagnetic (EM) geophysical surveys are widely used in mineral, hydrocarbon, geothermal and groundwater exploration, in-situ mining, hydrocarbon, geothermal and groundwater resource monitoring, unexploded ordinance (UXO), improvised explosive device (IED), tunnel, and underground facility (UGF) detection, geosteering, bathymetry mapping, ice thickness mapping, and environmental monitoring. The state of the art in EM geophysical surveying has been described by Zhdanov, 2009.

To provide economical reconnaissance of subsurface geological structures and man-made objects, EM sources and/or EM sensors are often deployed from moving platforms such as vessels, wireline devices, bottom hole assemblies (BHAs), vehicles, airplanes, helicopters, airships, and unattended aerial systems (UAS).

For example, airborne EM surveys from fixed wing aircraft typically acquire 500 line km of data each day, and airborne EM surveys from helicopters typically acquire 200 line km of data each day. Airborne EM surveys typically contain multiple survey lines that aggregate as hundreds to thousands of line kilometers of EM data measured every few meters and cover an area hundreds to thousands of square kilometers in size.

Over the last twenty years, airborne EM systems have evolved with ever higher moments, and hardware and processing technologies have improved data quality significantly. Nevertheless, very few discoveries of economic mineral deposits have been directly attributed to airborne EM. Modern airborne EM systems can provide real time acquisition and processing of global positioning system (GPS) located and time synchronized EM data. However, the non-linear physics of EM implies that these raw EM data cannot be transformed for direct characterization of the subsurface conductivity in real time. The state of the art airborne EM interpretation is not real time and is based on various 1D methods such as conductivity depth images (CDIs), conductivity depth transforms (CDTs), layered earth inversions, laterally constrained layered earth inversions, and spatially constrained layered earth inversions which cannot reliably or accurately capture the geological complexity of the 3D subsurface conductivity. Therefore, a need exists in airborne EM interpretation resulting in 3D volume imaging of EM data.

Given the time sensitivity of today's economic environment for mineral exploration, there exists a need in airborne EM surveying with real time 3D volume imaging of EM data to improve mineral exploration success.

As another example, formation evaluation based on borehole electrical conductivity measurements is one of the geophysical methods applied to hydrocarbon exploration and production. From the original wireline induction logging devices, technologies have evolved such that EM systems are now deployed in bottom hole assemblies (BHAs) for logging-while-drilling (LWD) and measurement-while-drilling (MWD). State of the art interpretations of LWD and MWD EM data are based on various 1D methods which cannot reliably or accurately capture the geological complexity of the 3D subsurface conductivity. Moreover, there is considerable interest in the development of "look ahead" or imaging-while-drilling technologies that will optimize well placement for improved oilfield production rates. Given very limited data transfer rates from the BHA to the operator, there is a need to develop real time 3D volume imaging of EM data at the BHA so that 3D volume images of the formations around and ahead of the BHA can be transmitted to the drilling operator in real time.

Subsurface imaging has applications beyond resource exploration and production. EM geophysical methods have been developed for detecting unexploded ordinance (UXO) that contain metal and/or electronic parts. While this UXO detection is relatively mature discipline for weapons test site remediation, improvised explosive devices (IEDs) made primarily from fertilizer and lacking metal or electronic parts represent a persistent direct threat to civilian and military personnel in combat zones. IEDs are far more difficult to detect than standard UXO. There exists an urgent need for real time 3D volume imaging of EM data measured from UASs and vehicles for IED detection and discrimination.

The development and use of high-resolution airborne and satellite surveillance has prompted the widespread proliferation of covert tunnels and underground facilities (UGFs). UGFs are used to produce and harbor both weapons and illegal drugs, and in the case of tunnels, move contraband and people without detection across international borders. There exists an urgent need for real time 3D volume imaging of EM data for tunnel and UGF detection and monitoring.

BRIEF SUMMARY

Electromagnetic (EM) geophysical surveys may encompass marine, borehole, ground and airborne electromagnetic measurements from moving platforms such as but not limited to vessels, wireline devices, bottom hole assemblies (BHAs), vehicles, airplanes, helicopters, airships, and unattended aerial systems (UAS).

EM geophysical surveys may encompass measuring one or more components of the electric and/or magnetic potentials and/or fields and/or their time derivatives ("EM data") with at least one inductive and/or galvanic and/or capacitive sensor, where the EM data are due to the propagation and/or scattering of electromagnetic waves in the earth due to natural EM sources and/or man-made inductive sources and/or man-made galvanic sources, where the EM data can be processed and/or analyzed in either the time-domain or the frequency-domain.

An EM system may encompass any system for measuring at least one natural EM source and/or man-made inductive source and/or man-made galvanic source, at least one inductive and/or galvanic and/or capacitive sensor, and a processor where EM data may be stored and/or transferred and/or recorded and/or processed either in real time or after completion of the EM survey. The EM system may be mounted on at least one moving platform equipped with a recording unit(s) for measuring spatial location information of the at least one platform and/or EM sources and/or EM sensors.

In at least one embodiment of a method disclosed herein, the volume imaging can be applied in real time to EM data acquired along survey lines from the start of the survey up to the given time moment t. This will generate a temporal volume image of the electrical conductivity m(t) located under and near the survey lines. These processes can be repeated for a sequence of time moments $t_1 < t_2 < \ldots < t_n$. The temporal electrical conductivity models, $m(t_1), m(t_1), \ldots m(t_n)$, produce a sequence of real time volume images of the subsurface geological structures and/or man-made objects.

In at least one embodiment of a method disclosed herein, the EM data measured for each combination of EM source and/or EM sensor may be imaged using a moving sensitivity domain that captures the finite spatial sensitivity of each combination of EM sources and/or EM sensors at a given time moment t to generate a real time volume image.

Real time volume imaging can be applied to EM data generated from EM sources and/or EM sensors mounted from at least one moving platform from the start of the survey up to the given time moment t. In at least one embodiment of a method disclosed herein, the subsurface geological structures and/or man-made objects may be real time volume imaged by 3D inversion of the measured EM data as a 3D electrical conductivity model. In at least one other embodiment of a method disclosed herein, the subsurface geological structures and/or man-made objects may be volume imaged by an approximate 3D inversion of the measured EM data into a 3D electrical conductivity model. In yet at least one other embodiment of a method disclosed herein, the subsurface geological structures and/or man-made objects may be volume imaged by 3D migration (holographic imaging) of the measured EM data into a 3D electrical conductivity model.

In at least one embodiment of the method disclosed, a graphical user interface (GUI) may be used to display the real time volume images from the start of the survey up to the given time moment t, and these may include information and/or classifications about the measured and/or inferred locations and physical properties of geological structures and/or man-made objects that were computed and/or interpreted from the real time volume images from the start of the survey up to the given time moment t.

In practice, reconstruction of the volume images from the start of the survey up to the given time moment t in accordance with this disclosure may be accomplished using a processor and/or GUI located on or separate from the at least one moving platform.

At least one embodiment of a method disclosed herein, can be applied for subsurface imaging of geological structures and/or man-made objects for mineral, hydrocarbon, geothermal and groundwater exploration, in-situ mining, hydrocarbon, geothermal and groundwater resource monitoring, unexploded ordinance (UXO), improvised explosive device (IED), tunnel, and underground facility (UGF) detection, geosteering, bathymetry mapping, ice thickness mapping, and environmental monitoring, using EM data generated from EM sources and/or EM sensors mounted from at least one moving platform such as but not limited to a vessel, wireline device, bottom hole assembly (BHA), vehicle, airplane, helicopter, airship or unattended aerial system (UAS).

At least one embodiment of this method can be used in geophysical exploration for mineral, hydrocarbon, geothermal, and groundwater resources.

At least one embodiment of this method can be used in geophysical monitoring for in-situ mining, hydrocarbon, geothermal, and groundwater resources.

At least one embodiment of this method can be used for detecting UXO, IEDs, tunnels, and UGFs.

At least one embodiment of this method can be used for geosteering.

At least one embodiment of this method can be used for formation evaluation and resistivity imaging-while-drilling.

At least one embodiment of this method can be used for mapping bathymetry in shallow and/or temporal and/or turbid water.

At least one embodiment of this method can be used for mapping ice thickness.

At least one embodiment of this method can be used for environmental monitoring, such as salinity, acid mine drainage, and pollution plumes.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
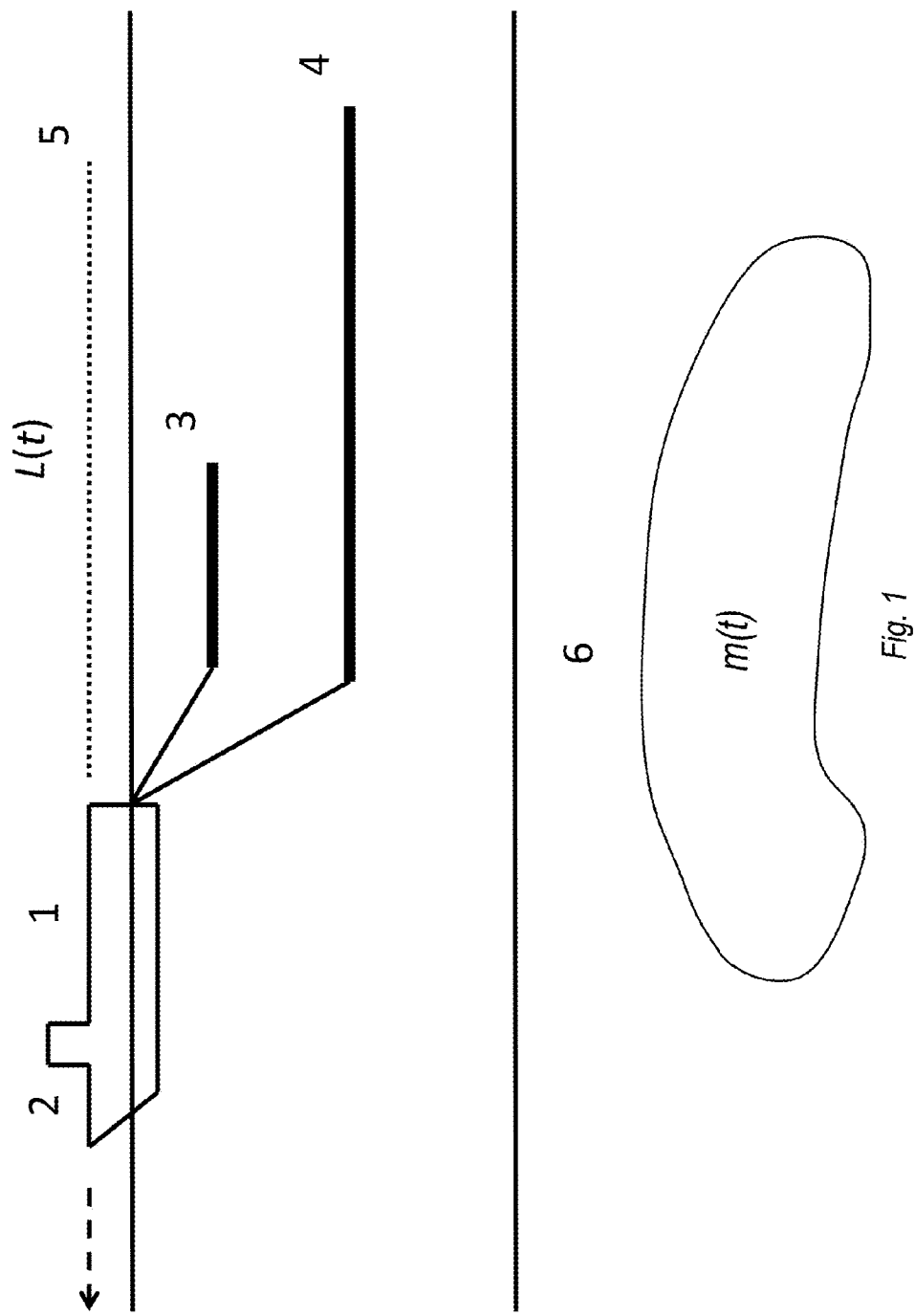
FIG. 1 illustrates an embodiment of a system for real time volume imaging of conductivity including EM sources and/or EM sensors attached to a vessel moving at some elevation along a survey line L(t) above the surface of the examined medium.

One embodiment of a real time volume imaging system is illustrated in FIG. 1. A real time volume imaging system 1, located on a vessel 2, may include EM sources 3 and EM sensors 4 attached to the vessel that is moving at some elevation along a survey line L(t) 5 above the surface of an examined medium 6 (FIG. 1).

Figure 2:
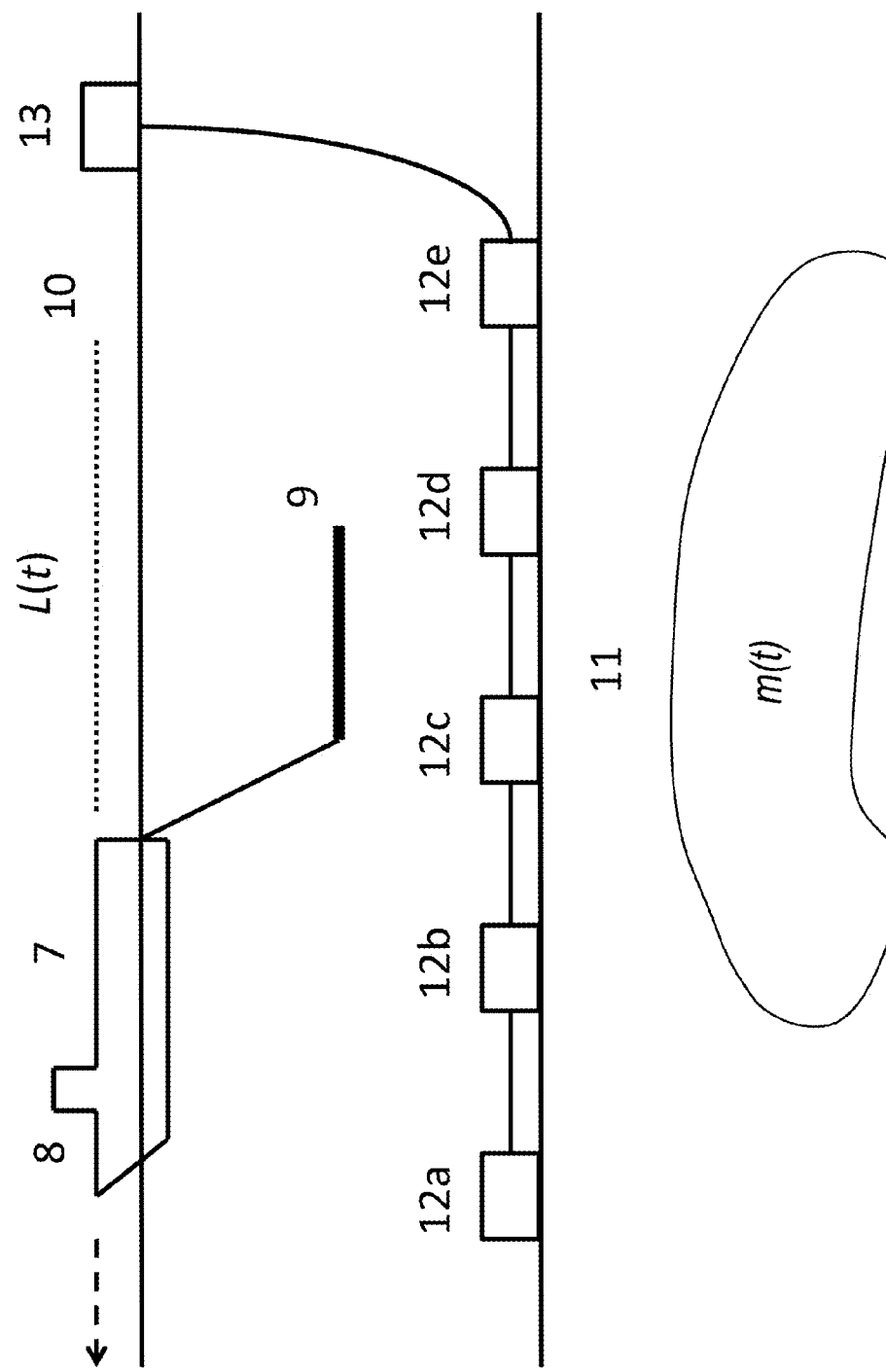
FIG. 2 illustrates an embodiment of a system for real time volume imaging of conductivity including EM sources attached to a vessel moving at some elevation along a survey line L(t) above the surface of the examined medium upon which upon which EM sensors are cable deployed and the EM data transmitted in real time from a buoy to the real time imaging system.

Another embodiment of a real time volume imaging system is illustrated in FIG. 2. A real time imaging system 7, located on a vessel 8, may include EM sources 9 attached to the vessel that is moving at some elevation along a survey line L(t) 10 above the surface of the examined medium 11 upon which EM sensors 12 are deployed. EM data measured by the EM sensors 12 may be transmitted in real time from a buoy 13 that is connected to the EM sensors 12 to the real time volume imaging system 7 (FIG. 2).

Figure 3:
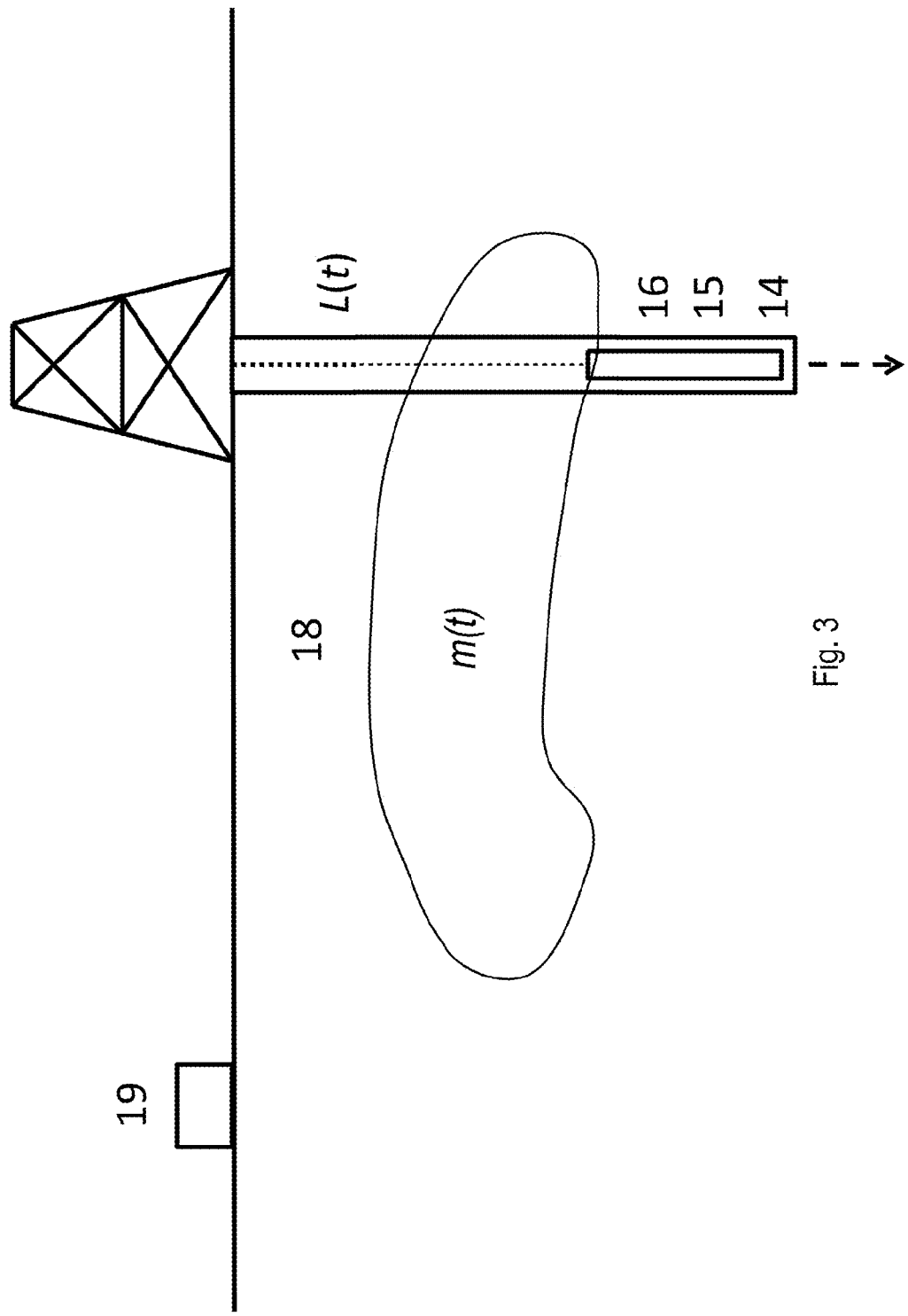
FIG. 3 illustrates an embodiment of a system for real time volume imaging of conductivity including EM sources and EM sensors attached to a bottom hole assembly (BHA) that is moving along a survey line L(t) through the examined medium.

Another embodiment of a real time volume imaging system is illustrated in FIG. 3. A real time volume imaging system 14, located in a bottom hole assembly (BHA) for resistivity imaging-while-drilling, may include EM sources 15 and EM sensors 16 located in the BHA. The BHA may be moving at a trajectory along a survey line 17 through an examined medium 18. A real time volume image is transmitted from the real time volume imaging system 14 to a remotely located GUI 19 (FIG. 3).

Figure 4:
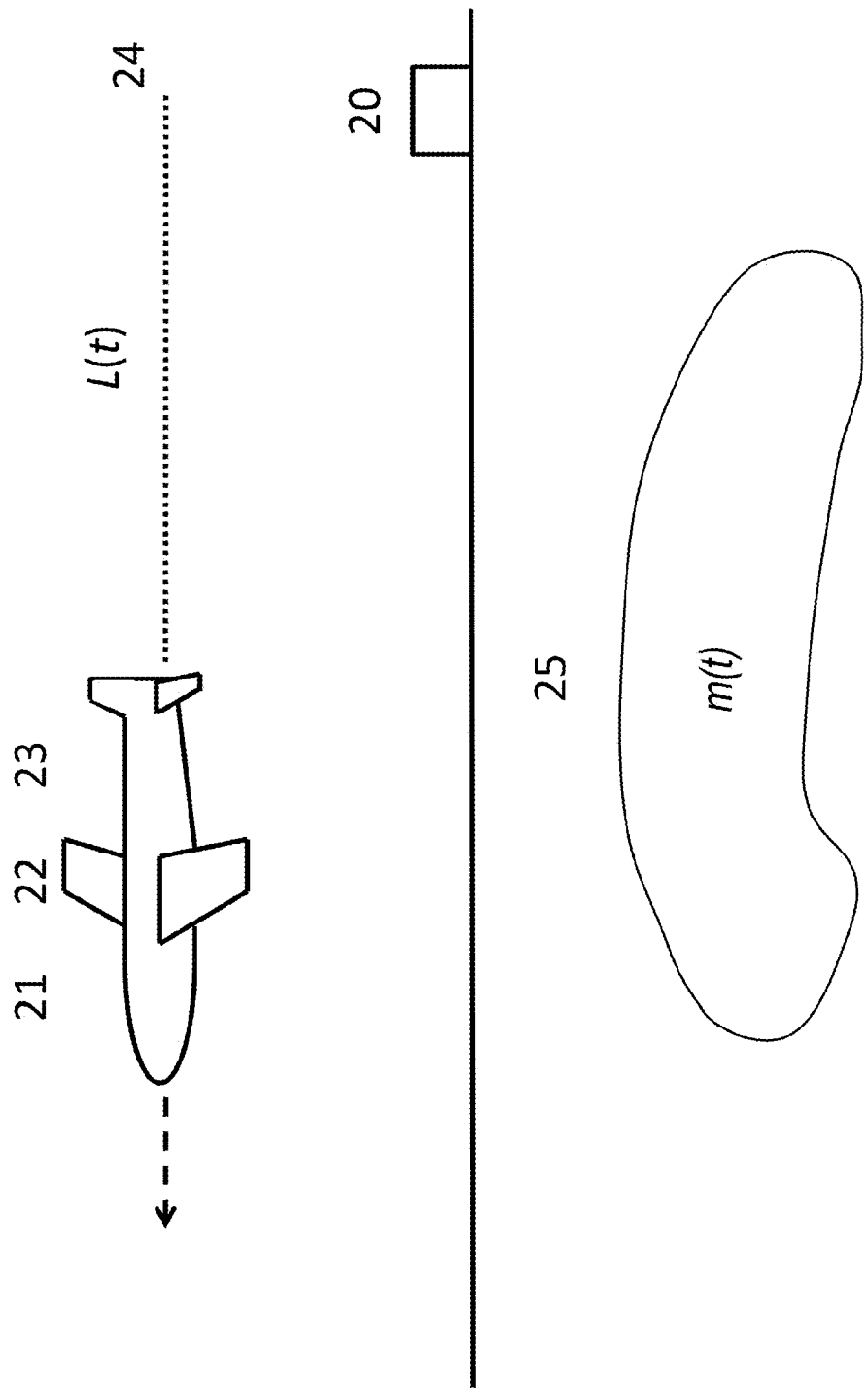
FIG. 4 illustrates an embodiment of a system for real time volume imaging of conductivity including EM sources and EM sensors mounted on an unattended aerial system (UAS) that is moving along a survey line L(t) above the surface of the examined medium and the EM data is transmitted from the UAS to the real time volume imaging system.

Another embodiment of a real time volume imaging system is illustrated in FIG. 4. A real time volume imaging system 20 is remotely located from a moving platform that may be an unattended aerial system (UAS) 21 that may include EM sources 22 and/or EM sensors 23 attached to the UAS. The UAS may move at some elevation along a survey line L(t) 24 above the surface of an examined medium 25 and the EM data is transmitted in real time from the UAS 21 to the real time volume imaging system 20 (FIG. 4).

Figure 5:
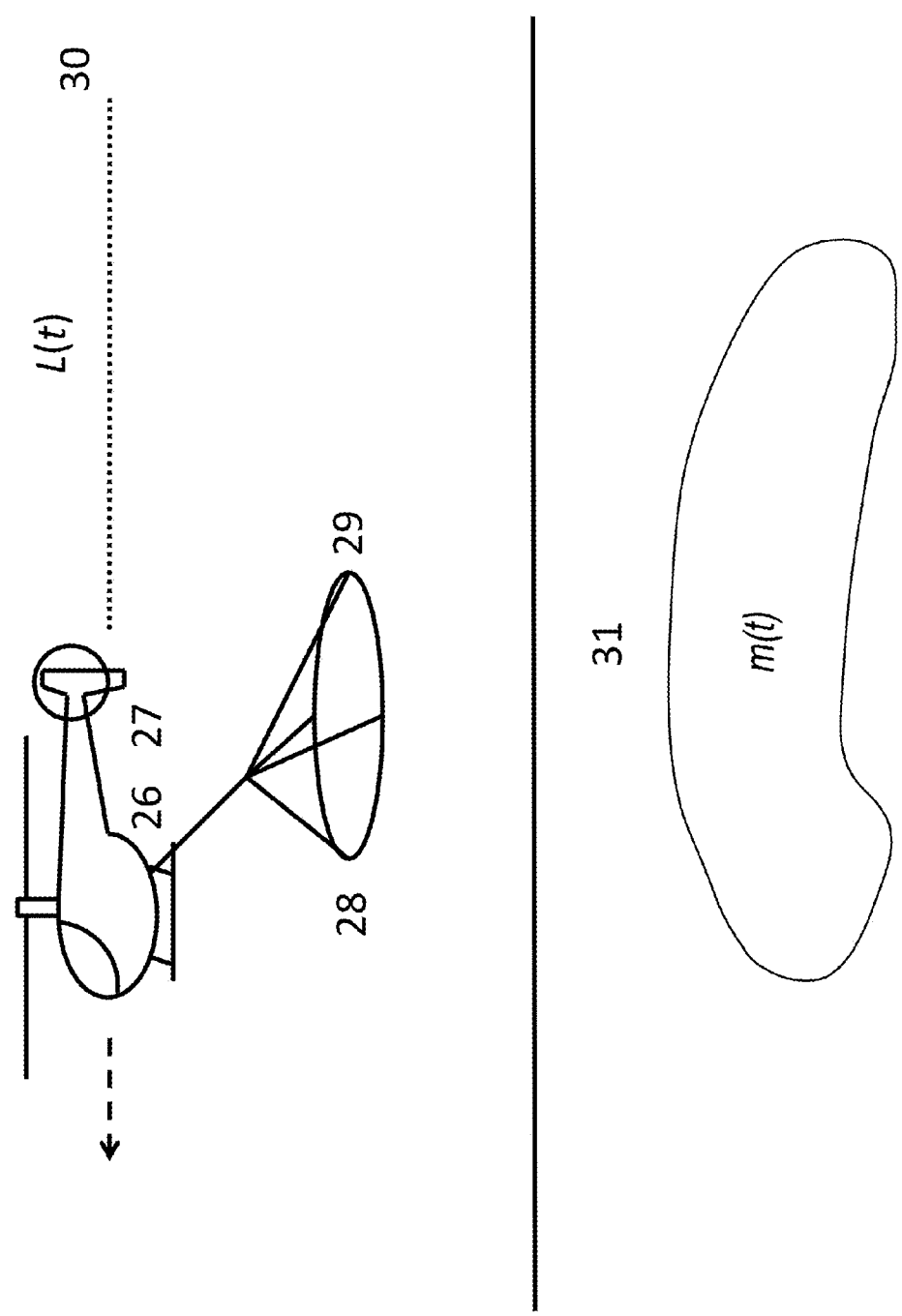
FIG. 5 illustrates an embodiment of a system for real time volume imaging of conductivity including EM sources and EM sensors attached to a helicopter that is moving along a survey line L(t) above the surface of the examined medium.

Another embodiment of a real time volume imaging system is illustrated in FIG. 5. A real time volume imaging system 26, located on a helicopter 27, may include EM sources 28 and/or EM sensors 29 attached to the helicopter that is moving at some elevation along a survey line L(t) 30 above the surface of an examined medium 31 (FIG. 5).

Figure 6:
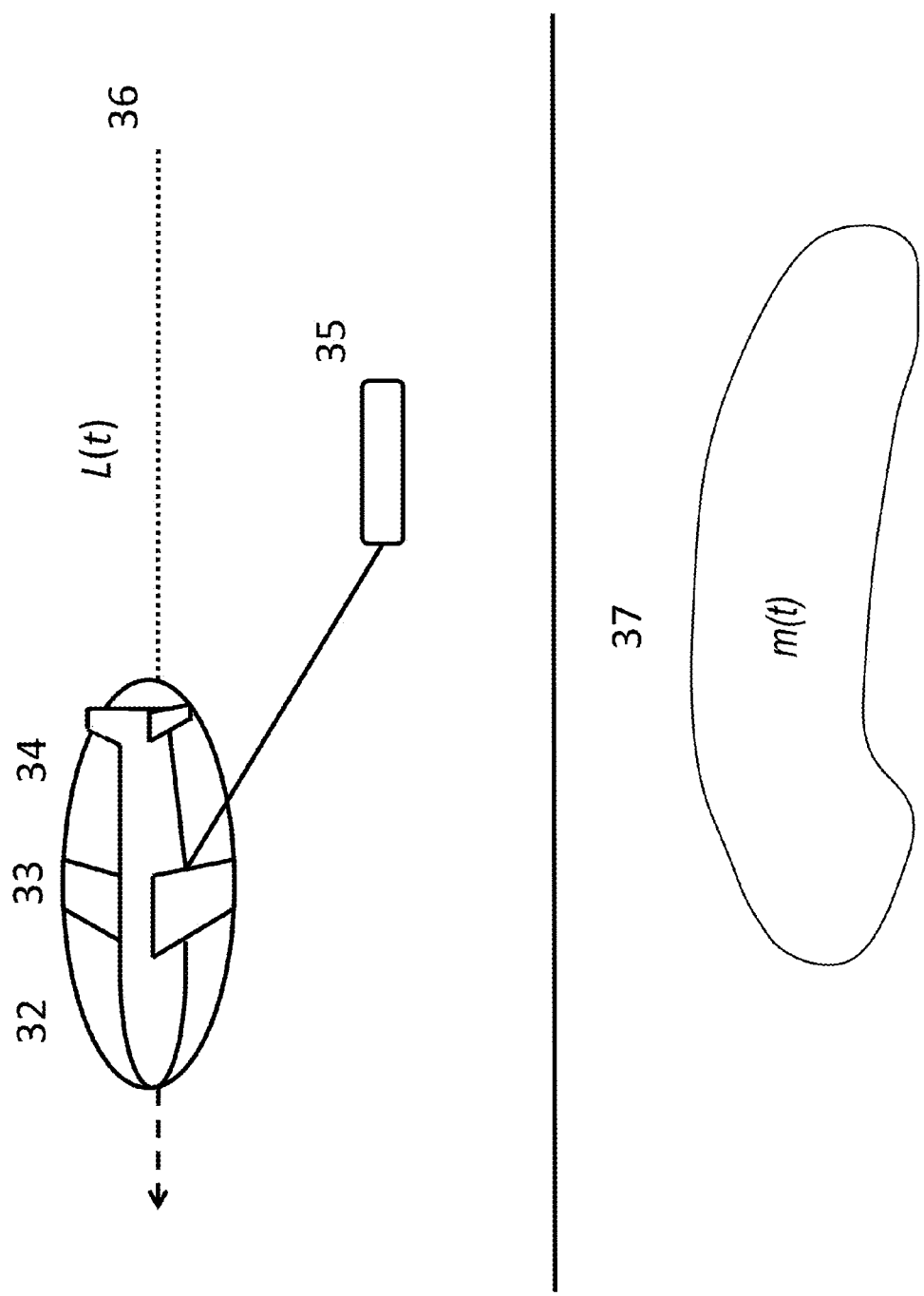
FIG. 6 illustrates an embodiment of a system for real time volume imaging of conductivity including EM sources and EM sensors attached to a fixed wing aircraft that is moving along a survey line L(t) above the surface of the examined medium.

Yet another embodiment of a real time volume imaging system is illustrated in FIG. 6. A real time volume imaging system 32, located on a fixed wing aircraft 33, may include EM sources 34 and/or EM sensors 35 attached to the fixed wing aircraft that is moving along a survey line L(t) 36 at some elevation above the surface of an examined medium 37 (FIG. 5).

In the embodiment of FIG. 6, the EM sensors 35 may record the electric and/or magnetic potentials and/or fields and/or their time derivatives generated by subsurface geological formations and/or objects, along the survey line L(t) 36 flown by the fixed wing aircraft from the start of the survey up to the given time moment t. Real time volume imaging may be applied to the EM data collected along the survey line L(t) 36 flown by the fixed wing aircraft from the start of the survey up to the given time moment t. The real time volume image will be a temporal electrical conductivity model m(t) of the examined medium 37 located directly under and/or nearby the survey line(s) and/or or area flown from the start of the survey up to the given time moment t.

Figure 7:
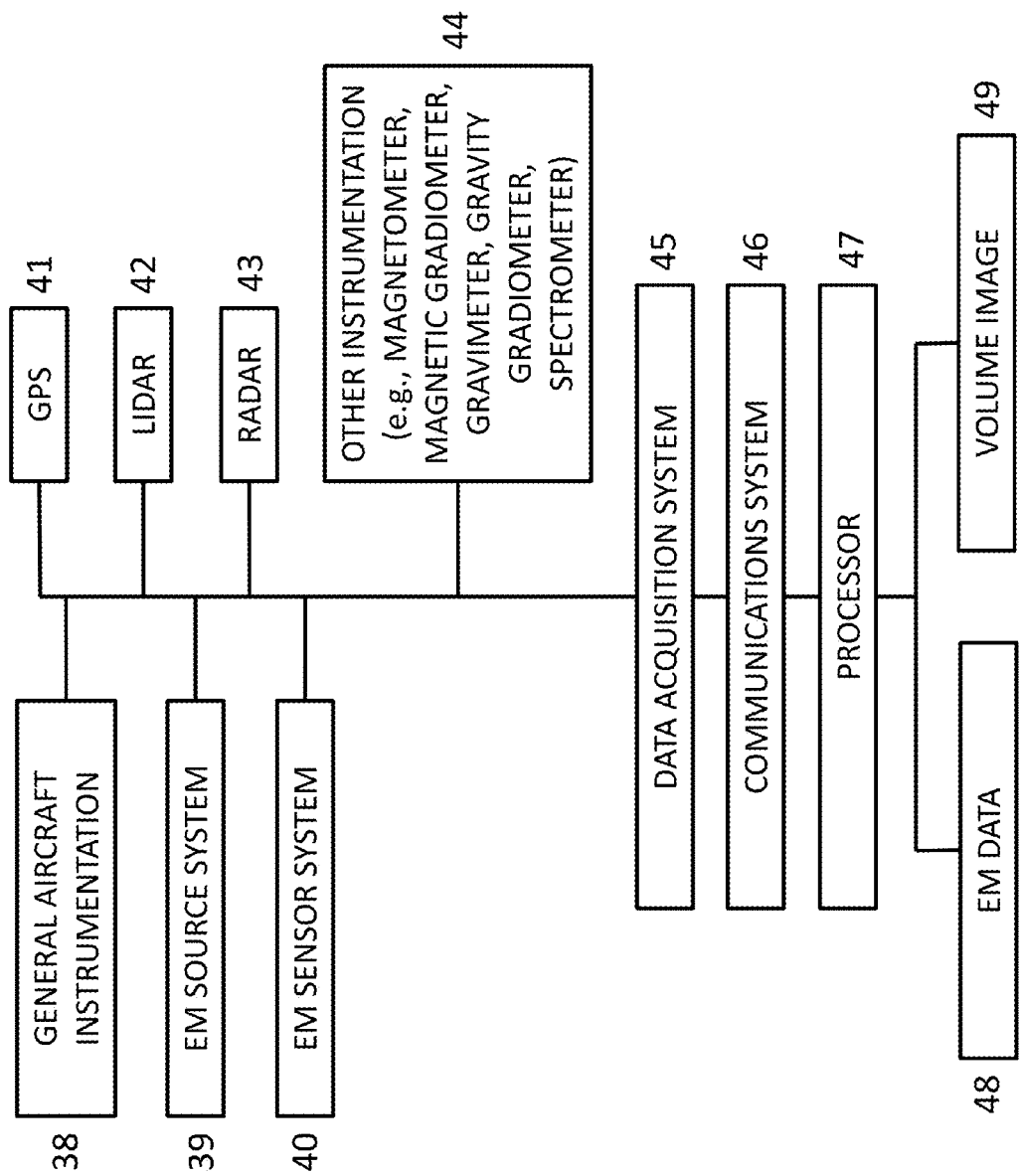
FIG. 7 illustrates an embodiment of a system for real time volume imaging from a fixed wing aircraft.

An embodiment of a system for real time volume imaging from a fixed wing aircraft is illustrated in FIG. 7, which illustrates an embodiment of a real time volume imaging system 32. The real time volume imaging system may include general aircraft instrumentation 38, EM source system 39, EM sensor system 40, global positioning system (GPS) 41, LIDAR altimetry 42, radar altimetry 43, other geophysical sensor systems including but not limited to magnetometers, magnetic gradiometers, gravimeters, gravity gradiometers and spectrometers 44, data acquisition system 45, communications system 46, and processor 47, which collectively can produce EM data 48 and real time volume images 49.

Figure 8:
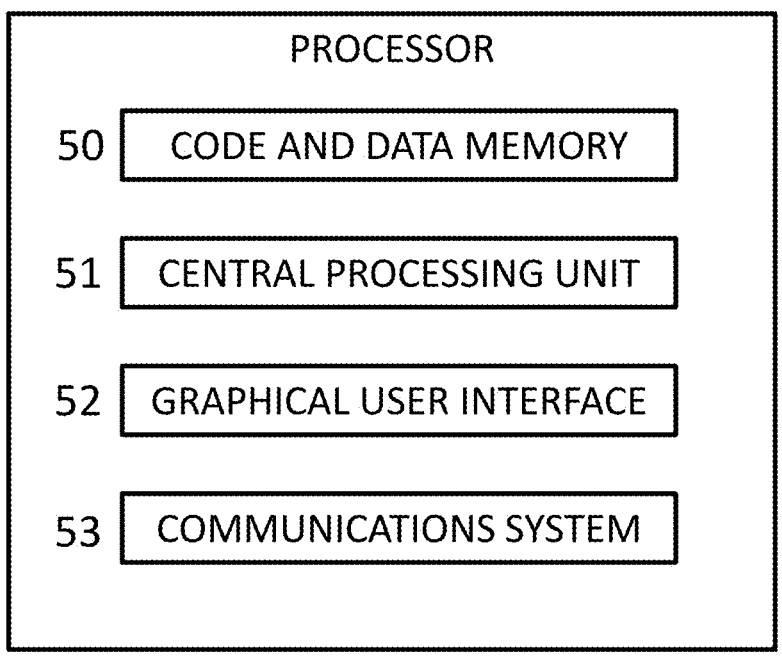
FIG. 8 illustrates an embodiment of a processor for real time volume imaging.

An embodiment of a processor 47 is illustrated in FIG. 8. It will be appreciated that the processor 47 may be implemented in the real time volume imaging systems previously described in FIGS. 1 to 8. The processor 47 may include, for example, a data and code memory 50 for storing EM data received in real time from the data acquisition system 45 via the communications system 46, real time volume imaging computer software and real time volume images, a central processing unit 51 for executing the real time volume imaging computer software on the real time EM data to generate real time volume images, a graphical user interface (GUI) 52 for displaying the real time volume images, and a communications system 53 for real time system interoperability. The processor 47 may comprise of a single processing unit or can be distributed across one or more processing units in one or more locations. The communications system 53 can include I/O interfaces for exchanging information with one or more external devices. The data and code memory 50 may comprise of a single memory device or can be distributed across one or more memory devices in one or more locations connected via the communications system 53. The communications system 53 may transmit real time volume images to a remotely located GUI 52.

Figure 9:
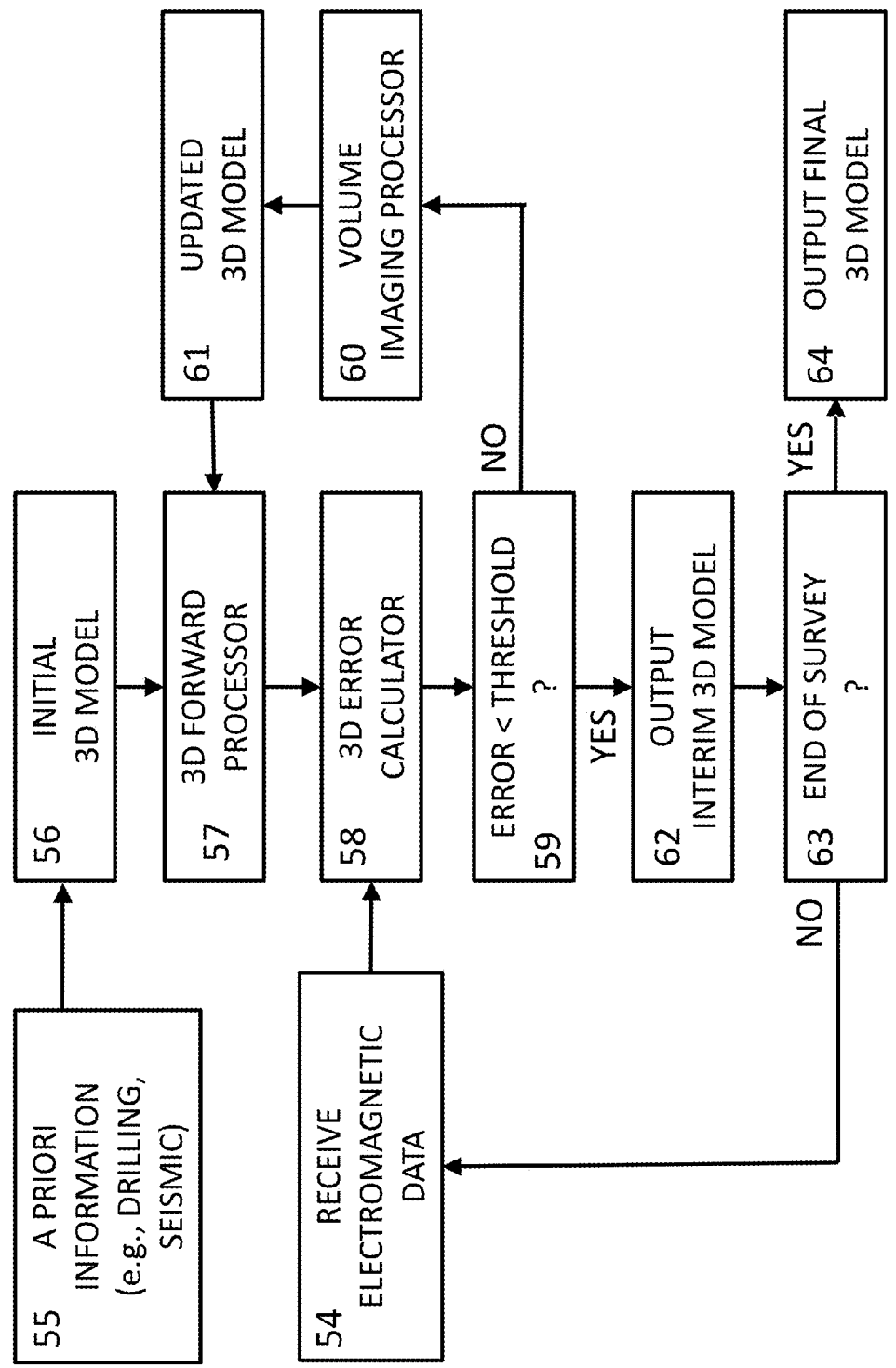
FIG. 9 illustrates an embodiment of a method for real time volume imaging.

An embodiment of a method for real time volume imaging is schematically shown in FIG. 9. It will be appreciated that the method of FIG. 9 may be implemented or performed by the real time volume imaging systems previously described in FIGS. 1 to 8.

In the embodiment, EM data 54 may be generated by at least one EM sensor measuring at least one EM source along a survey line(s) from the start of a survey up to the given time moment $t_n$, such as previously described in relation to FIGS. 1 to 7 and may be recorded by the processor 47. The processor 47 may also process the EM data in real time by methods of digital signal processing techniques including but not limited to de-noising, telluric cancellation, sferic rejection, stacking, filtering, deconvolution, convolution, and primary field stripping. The processor 47 may also merge spatial location information with the EM data.

In the embodiment, a priori information 55 of geological structures and/or objects may be independently accessed, known and/or inferred from other sources prior to the survey such as but not limited to geological mapping, drilling, seismic imaging, magnetic inversion and/or gravity inversion. The a priori information 55 may be used to construct an initial 3D electrical conductivity model 56. A 3D forward processor 57 may compute predicted EM data from the start of the survey to the given time moment $t_n$ from the initial 3D conductivity model 56.

An error calculator 58 may compute the error between the predicted EM data and observed or measured EM data 54 from the start of the survey to the given time moment $t_n$. If the error between the predicted EM data and observed EM data

54 is greater than a threshold 59, a 3D inversion operator 60 may compute an updated 3D conductivity model 61. The 3D forward processor 57 may compute the predicted EM data from the updated 3D conductivity model 61 from the start of the survey to the given time moment $t_n$.

The aforementioned 3D inversion process is iterated until terminated by at least one operator determined termination condition such as the error decreasing below the preset threshold 59. Once the 3D inversion process is terminated, an interim 3D electrical conductivity model 62 is generated for the given time moment $t_n$. The interim 3D electrical conductivity model 62 is the real time volume image. If the survey is not complete 63, the aforementioned process is iterated for the next time moment $t_{n-1}$ until the survey is completed. If the survey is complete, the interim 3D electrical conductivity model 62 is the final 3D electrical conductivity model 64.

For the present embodiment, one skilled in the art will recognize that the final 3D electrical conductivity model 64 is equivalent to the volume image generated from EM data upon completion of the EM survey and that the volume image for part of or all of the entire EM survey may be created after completion of the EM survey.

In the present embodiment, the initial 3D electrical conductivity model 56 may be constructed in real time from 1D methods including but not limited to conductivity depth images (CDIs), conductivity depth transforms (CDTs), layered earth inversions, laterally constrained layered earth inversions, and spatially constrained layered earth inversions of the EM data.

In the present embodiment, the initial 3D electrical conductivity model at the time moment $t_n$ may be constructed from in real time from the interim 3D electrical conductivity model at the time moment $t_{n-1}$.

Figure 10:
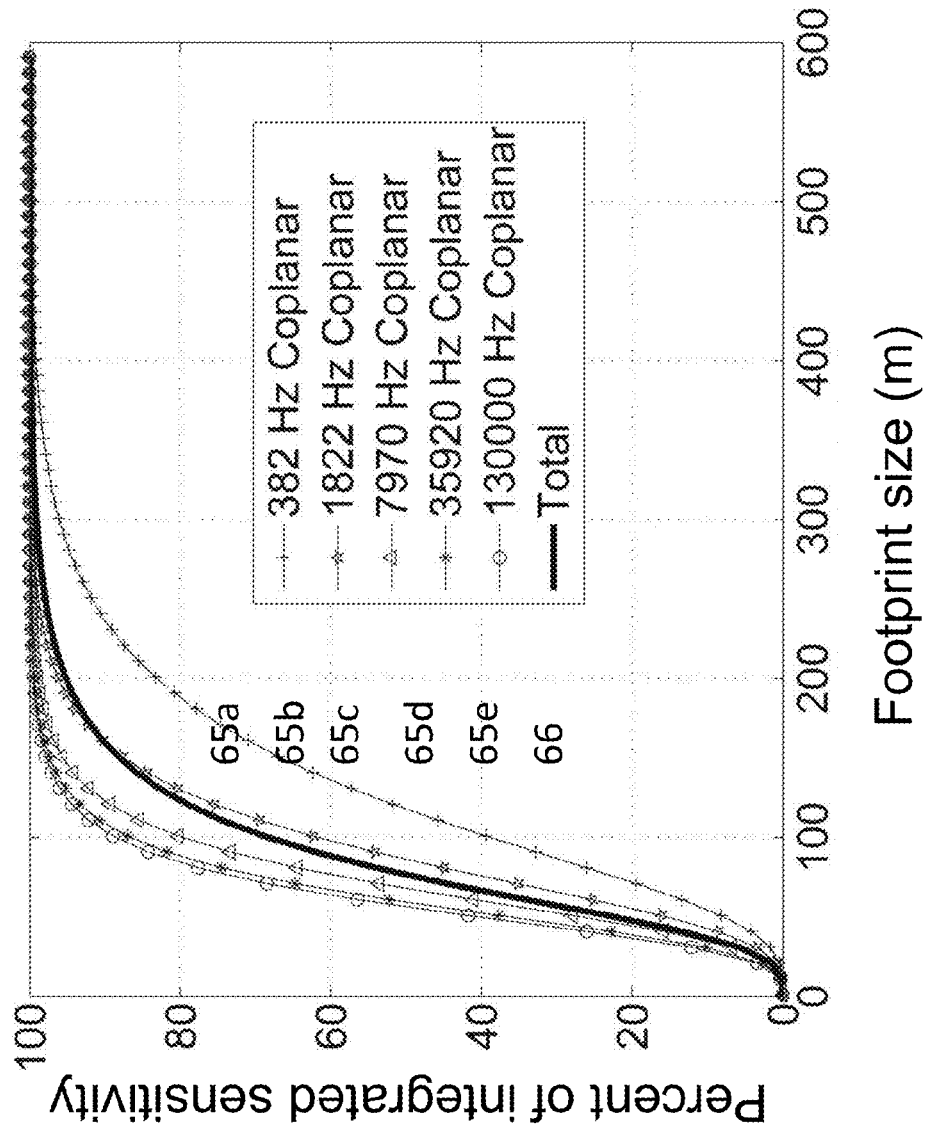
FIG. 10 illustrates an example of a sensitivity domain for a frequency-domain helicopter EM system of inductive sources and receivers flown 37 m above a 200 mS/m half-space.
Figure 11A:
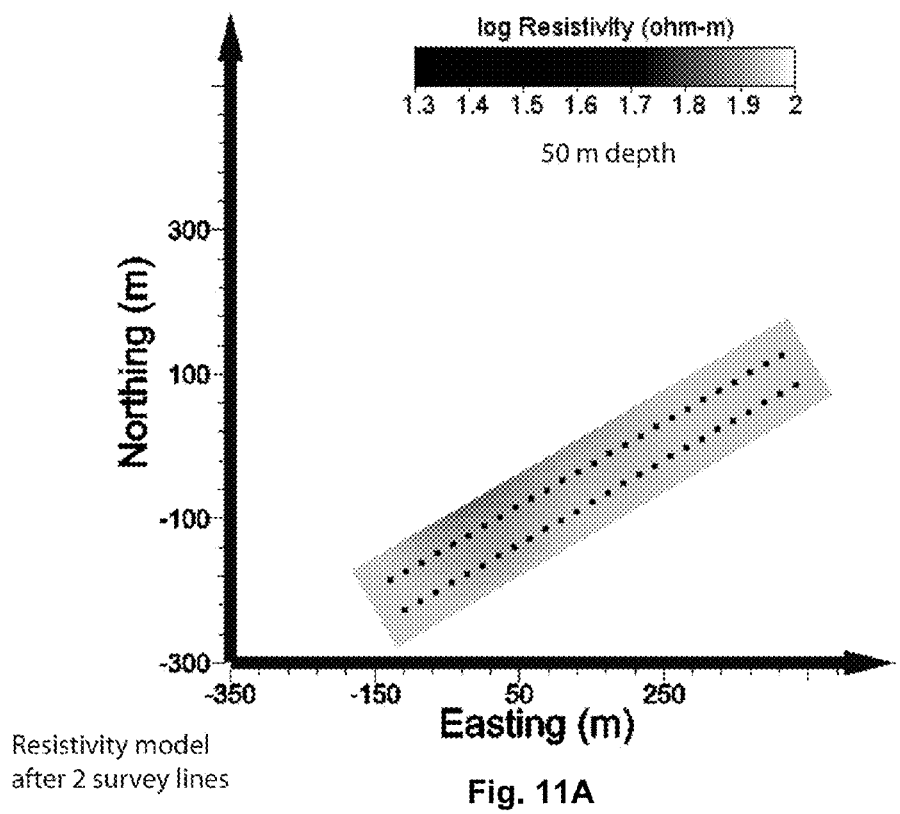
FIGS. 11A-11H illustrate an example of real time volume imaging for a frequency-domain helicopter EM system by showing temporal volume images for different time moments in an EM survey.
Figure 11B:
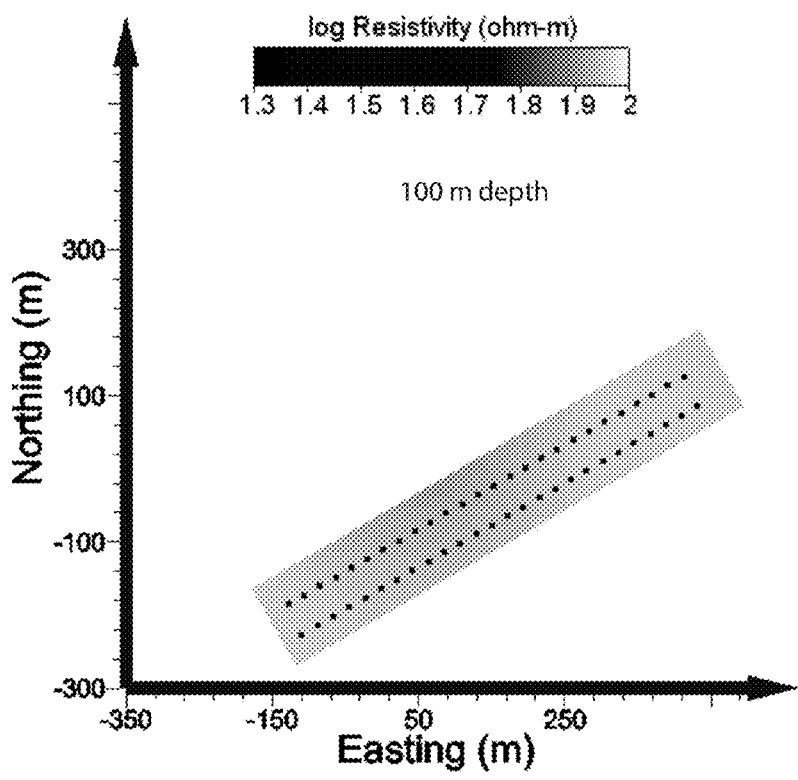
Figure 11C:
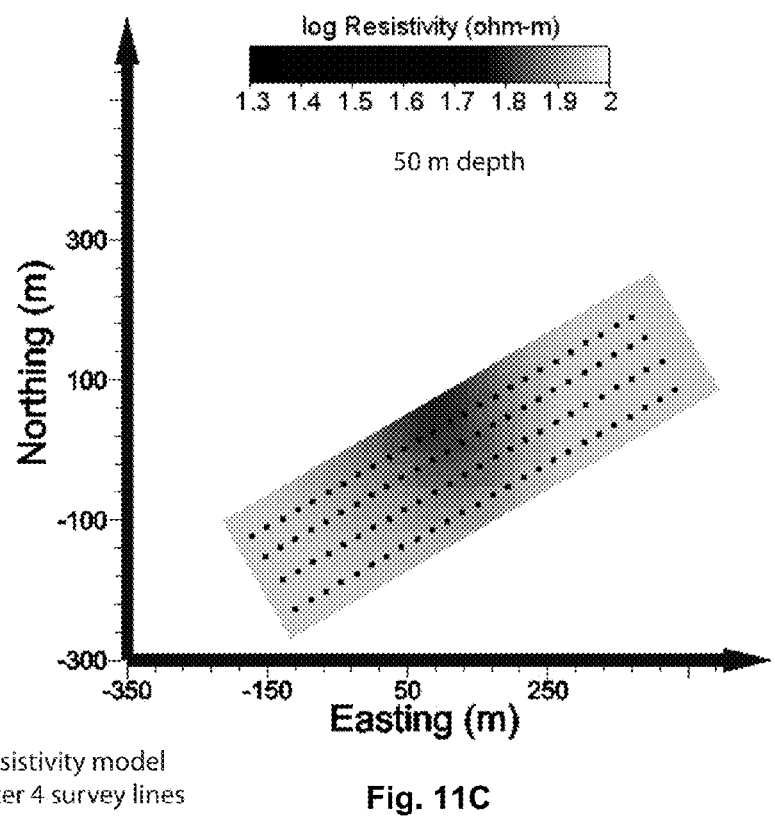
Figure 11D:
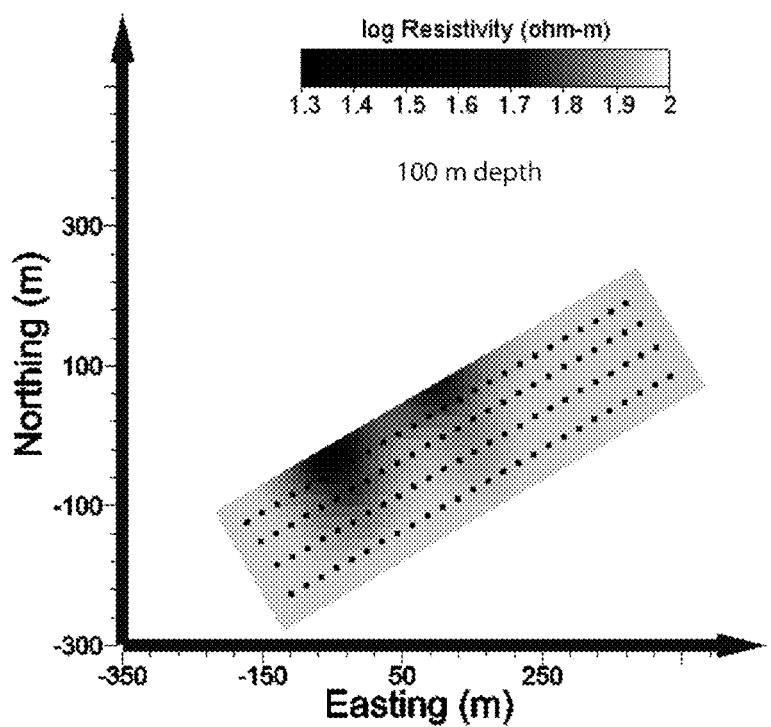
Figure 11E:
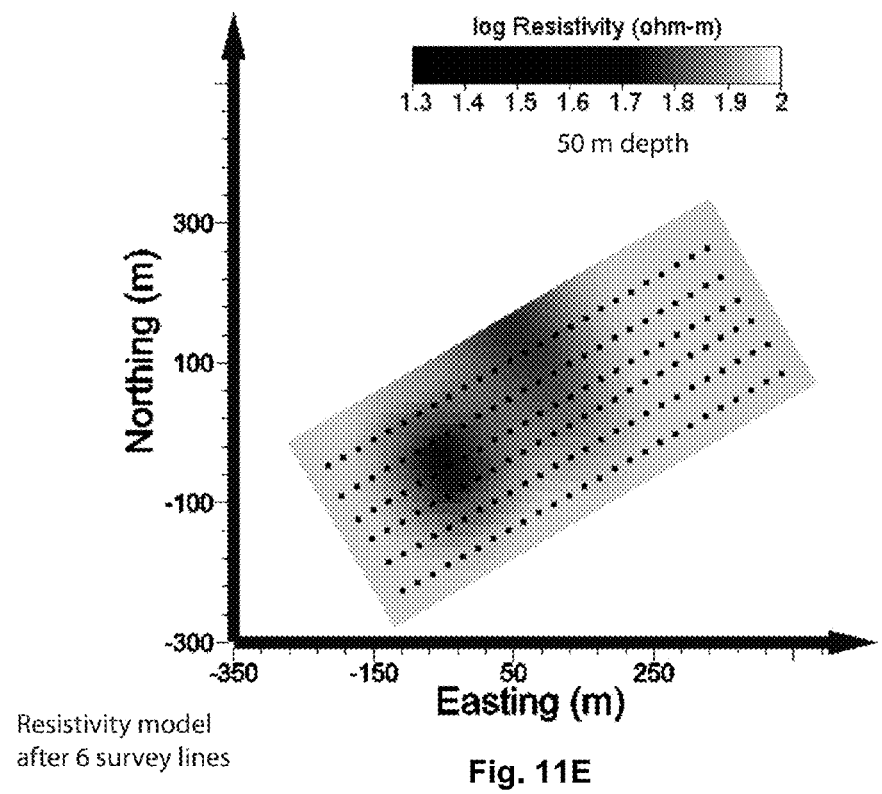
Figure 11F:
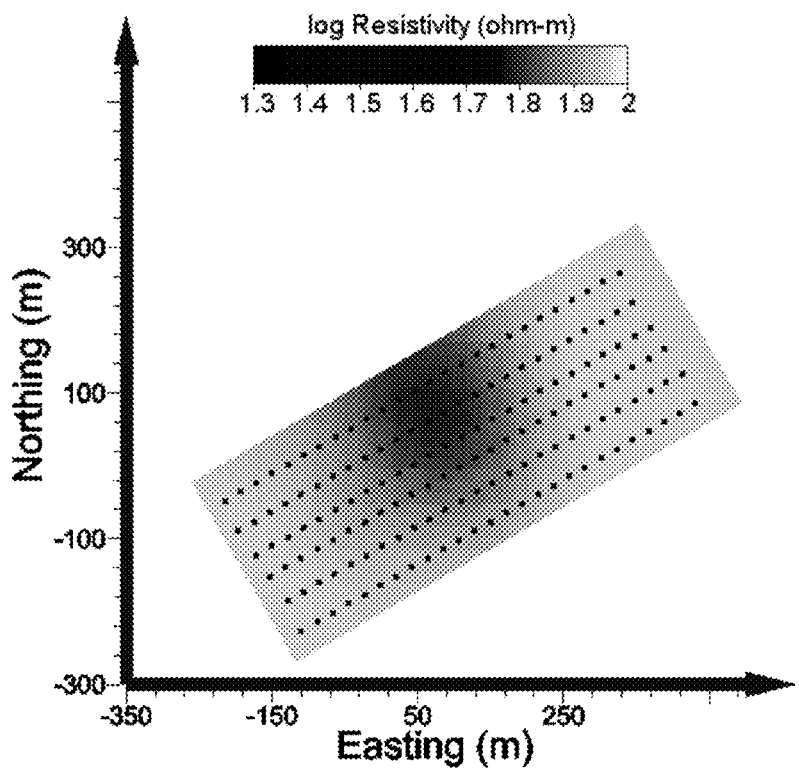
Figure 11G:
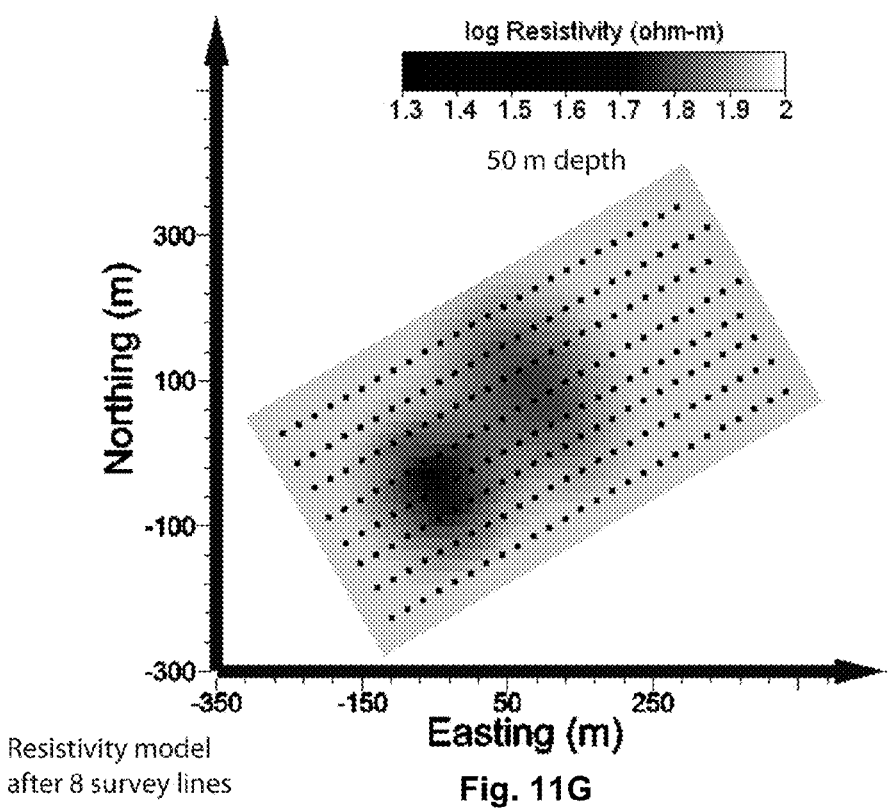
Figure 11H:
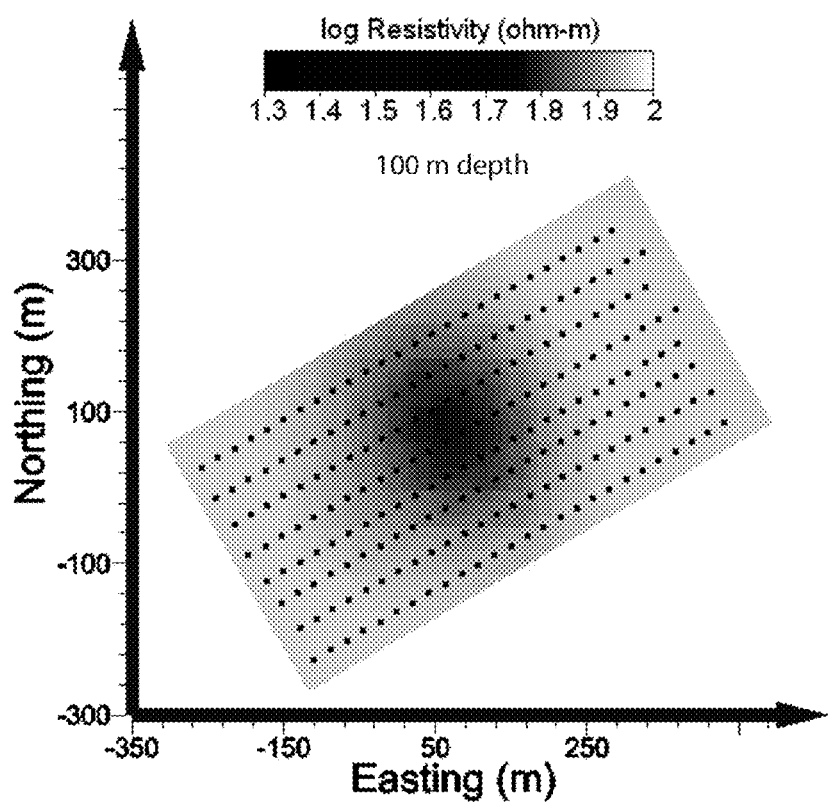

A demonstration of an EM system sensitivity domain for the present embodiment is shown in FIG. 10. For the purpose of demonstration, a frequency-domain helicopter EM system has been simulated for an inductive source and inductive sensor height of 37 m above a half-space of 200 mS/m. FIG. 10 presents the integrated sensitivity as a function of variable sensitivity domain size for each individual component and frequency 65 and the integrated sensitivity as a function of sensitivity domain size for all components and frequencies 66. The integrated sensitivity for all components and frequencies 66 shows that over 95% of the total EM sensitivity is produced from a 200 m EM system sensitivity domain.

In the present embodiment, the spatial dimensions of the EM system sensitivity domain may be calculated for each EM source and EM sensor pair, may consist of multiple dimensions where each of the multiple dimensions are specific for a given frequency and/or time and/or component measured by the EM sensor and/or spatial separation of the EM source and EM sensor pair and/or time moment t.

In the present embodiment, the 3D forward processor 57 may compute a numerical solution of Maxwell's equations in either the frequency-domain or the time-domain including but not limited to analytical, semi-analytical, finite difference, finite element, boundary element, integral equation and/or hybrid numerical methods. The 3D forward processor 57 may include further processing and/or computation of transfer functions so that the predicted EM data is an emulation of the actual EM system response. For each EM source and EM sensor pair, the predicted EM data from the start of the survey to a given time moment t are computed from a 3D electrical conductivity model that is a temporal subset of either the initial 3D electrical conductivity model 56, the interim 3D electrical conductivity model 62, the updated 3D electrical conductivity model 61, or the final 3D electrical conductivity model 64 that is of a finite spatial dimension equal to the dimensions of the EM system sensitivity domain.

In the present embodiment, the 3D forward processor 57 may compute an approximate solution of Maxwell's equations using linear approximations such as but not limited to the Born approximation, quasi-Born approximation, quasi-linear approximation, localized quasi-linear approximation, and quasi-analytical approximations and/or series.

In the present embodiment, the volume imaging processor 60 may use iterative linearized inversion and/or migration and/or line search and/or preconditioning techniques. Sensitivities and/or their actions may be computed from the start of the survey to a given time moment t either explicitly or implicitly by adjoint operators computed from a numerical solution of Maxwell's equations in either the frequency-domain or the time-domain including but not limited to analytical, semi-analytical, finite difference, finite element, boundary element, integral equation and/or hybrid numerical methods.

In the present embodiment, sensitivities and/or their actions may be approximated from the start of the survey to a given time moment t using linear approximations such as but not limited to the Born approximation, quasi-Born approximation, quasi-linear approximation, localized quasi-linear approximation, and quasi-analytical approximations and/or series.

In the present embodiment, the volume imaging processor 60 may include further processing and/or computation of transfer functions so that the sensitivities are an emulation of the actual EM system sensitivities. For each EM source and EM sensor pair, the sensitivities from the start of the survey to a given time moment t are computed from a temporal 3D electrical conductivity model that is a subset of either the initial 3D electrical conductivity model 56, the interim 3D electrical conductivity model 62, the updated 3D electrical conductivity model 61, or the final 3D electrical conductivity model 64 that is of a finite spatial dimension equal to the dimensions of the EM system sensitivity domain.

In the present embodiment, the volume imaging processor 60 assembles the sensitivities and/or their actions from the start of the survey to a given time moment t to generate the updated 3D electrical conductivity model 61 for the given time moment t by superposition of the sensitivities and/or their actions for all EM source and EM sensor pairs computed for the interim 3D conductivity model 62.

In the present embodiment, the volume imaging processor 60 may generate the updated 3D electrical conductivity model 61 for the given time moment t using regularization that may be inclusive smooth and/or focusing stabilizers including but not limited to Laplacian, first derivative, minimum norm, minimum support, minimum vertical support, minimum gradient support, and/or any combination thereof.

In another embodiment of the disclosure, real time volume images of variations in the subsurface electrical conductivity may be obtained from differencing the real time volume image with the final 3D electrical conductivity model generated from a previous EM survey. In at least one embodiment of the disclosure, the real time volume image of variations in the subsurface electrical conductivity may be interpreted for UXO, IEDs, tunnels, and/or UGFs for real time remediation of the threat.

In all embodiments of the method disclosed herein, the term electrical conductivity is used exclusively even though electrical resistivity is the reciprocal of electrical conductivity and the two terms can be interchanged without any loss of meaning or generality.

Due to physical-chemical polarization processes that accompany current flow in the earth, the electrical conductivities of earth materials such as rocks and/or fluids are a complex, frequency-dependent function. At least one embodiment of a method disclosed herein can be applied to volume imaging of the conductivity and/or dielectric permittivity and/or induced polarization relaxation terms such as but not limited to chargeability and/or time constant and/or frequency constant, of geological structures and/or man-made objects.

Marine EM systems may include but not be limited to moving source and fixed sensor systems, moving source and moving sensor systems, fixed source and moving sensor systems, magnetotelluric (MT) systems, and induced polarization (IP) systems.

Borehole EM systems include but not be limited to moving sources and/or moving sensors mounted in induction logging systems, tensor induction logging systems, cross-borehole induction logging systems, logging-while-drilling (LWD) systems, measurement-while-drilling (MWD) systems and imaging-while-drilling systems.

Ground EM systems may include but not be limited to moving source and fixed sensor systems, moving source and moving sensor systems, fixed source and moving sensor systems, very low frequency (VLF) systems, MT systems, and IP systems.

Airborne EM systems may include but not be limited to moving sources and/or moving sensors mounted on unattended aerial systems (UAS), fixed-wing aircraft with towed bird systems, fixed-wing aircraft with wing tip systems, fixed-wing aircraft with pod mounted systems, helicopter systems, audio-frequency magnetic (AFMAG) systems, VLF systems, MT systems, and IP systems.

Hybrid EM systems may involve any combination of fixed and/or moving sources with fixed and/or moving sensors based on any component of the aforementioned Marine EM systems, Borehole EM systems, Ground EM systems, and Airborne EM systems. For example, Borehole-to-Ground EM systems, Ground-to-Airborne EM systems, and Airborne-to-Ground EM systems.

EXAMPLE 1

The following is an example of at least some of the principles of real time volume imaging that is offered to assist in the practice of the disclosure. It is not intended to thereby limit the scope of the disclosure to any particular theory of operation or to any field of operation.

A typical airborne EM survey will contain multiple survey lines that aggregate as hundreds to thousands of line kilometers of EM data acquired every few meters and cover an area hundreds to thousands of square kilometers in size.

The following example of an airborne EM system is a frequency-domain EM system for which the inductive source and inductive sensors are mounted in a bird that is attached to a helicopter (FIG. 5).

The 3D earth model is discretized into a mesh of cells of constant physical properties. In the practice of the disclosure, the physical properties may include but not limited to conductivity, magnetic susceptibility, dielectric permittivity and induced polarization parameters, and these may be isotropic or anisotropic. In the following example, the physical property of conductivity is real and isotropic though the generalization to conductivity also being complex and/or anisotropic equally applies. The conductivity σ of each cell in the mesh of the 3D earth model may be separated into a background conductivity $\sigma_b$ and anomalous conductivity $\sigma_a$:

$$\sigma(r) = \sigma_b(r) + \sigma_a(r), \quad (1)$$

where r is a radius vector.

The 3D earth model is excited by an EM field generated by the EM source located on the moving platform with an electric current density $J^e$. This field is time harmonic as $e^{-i\omega t}$ and is measured by EM sensors also located on the moving platform.

The total electric (E) and magnetic (H) fields measured by the EM sensors from the start of the survey up to a given time moment t can be represented as the sum of the background electric ($E^b$) and magnetic ($H^b$) fields generated by the EM source in the 3D earth model with background conductivity, and anomalous electric ($E^a$) and magnetic ($H^a$) fields due to scattering from the anomalous conductivity:

$$E(r,t) = E^b(r,t) + E^a(r,t), \quad (2)$$

$$H(r,t) = H^b(r,t) + H^a(r,t). \quad (3)$$

From Maxwell's equations, a volume integral equation for the anomalous electric fields can be derived:

$$E(r',t) = E^b(r',t) + \int_V \hat{G}_E(r',r;t) \cdot \sigma_a(r) [E^b(r,t) + E^a(r,t)] d^3r, \quad (4)$$

where $\hat{G}_E(r', r; t)$ is the electric Green's tensor for the background conductivity model and may be invariant to the given time moment t.

The magnetic fields are then computed from the equation:

$$H(r',t) = H^b(r',t) + \int_V \hat{G}_H(r',r;t) \cdot \sigma_a(r) [E^b(r,t) + E^a(r,t)] d^3r, \quad (5)$$

where $\hat{G}_H(r', r; t)$ is the magnetic Green's tensor for the background conductivity model and may be invariant to the given time moment t.

In state of the art 3D EM modeling, the volume integrals of equations 4 and 5 are evaluated for those cells in the 3D earth model where the total conductivity differs from the background conductivity. A 3D earth model for an airborne EM survey may contain millions of cells, making numerical solutions to equations 4 and 5 intractable in real time.

Referring to FIG. 10, FIG. 10 demonstrates that 95% of the total EM sensitivity is produced from a 200 m EM system sensitivity domain. The area of the EM system sensitivity domain is considerably less than the area of the EM survey. It follows that there is no necessity to compute the volume integrals of equations 4 and 5 for those cells where the total conductivity differs from the background conductivity that are beyond the EM system sensitivity domain for a given EM source and EM sensor pair. FIG. 10 demonstrates that the size of the EM system sensitivity domain may vary with frequency. The size of the sensitivity domain may also vary with the location of the moving platform and with a given time moment t.

The volume integrals of equations 4 and 5 can be evaluated for those cells where the total conductivity differs from the background conductivity within the EM system sensitivity domain for a given EM source and EM sensor pair. Even though a 3D earth model for an airborne EM survey may contain millions of cells, limiting numerical solutions of equations 4 and 5 with a sensitivity domain for a given EM source and EM sensor pair is tractable in real time.

Using the method of moments, equation 4 can be reduced to the linear system:

$$E = (I - \Gamma \cdot \sigma_a)^{-1} \cdot E^b, \quad (6)$$

which needs to be solved for each time moment t where $E^b$ is the vector of basis function coefficients for the background electric field, I is the identity matrix, Γ is the matrix of volume integrated electric Green's functions for the background conductivity model, and $\sigma_a$ is a diagonal matrix of anomalous conductivities. Equation 6 solves directly for the total electric field E while retaining the distributed source in terms of the background electric fields $E^b$. This solution has the distinct computational advantage for 3D earth models with high conductivity contrasts or very resistive hosts where the background electric fields $E^b$ and anomalous electric fields $E^a$ are of near-equal amplitude but opposite sign. Given finite machine precision, the addition of the background and anomalous electric fields introduces numerical errors and inaccuracies in the predicted EM data.

The matrix of volume integrated electric Green's functions $\Gamma$ for the background conductivity model may be computed for at least one background conductivity model. In one embodiment of the present invention, the matrix of volume integrated electric Green's functions $\Gamma$ may be identical for each sensitivity domain, meaning they need only be calculated once and then translated over the 3D earth model. In other embodiments of the present invention, the matrix of volume integrated electric Green's functions $\Gamma$ may be pre-computed for a range of background conductivity models. In other embodiments of the present invention, the matrix of volume integrated electric Green's functions $\Gamma$ may be different for different sensitivity domains associated with a given time moment t of the surveying. For real time volume imaging, the matrix of volume integrated electric Green's functions $\Gamma$ may be pre-computed and stored prior to the survey so it does not have to be evaluated in real time.

For real time volume imaging, the volume integrated magnetic Green's functions of equation (5) can be pre-computed and stored prior to the survey so they do not have to be evaluated real time.

For iterative linearized inversion and/or migration with line search and/or preconditioning, the sensitivities $S_{i,j}$ of each EM data $d_i$ to perturbations in conductivity $\sigma_j$ in each cell of the 3D earth model:

$$S_{i,j} = \frac{\delta d_i}{\delta \sigma_j}, \quad (7)$$

need to calculate either implicitly or explicitly using adjoint operators and/or approximations along the survey lines covered by the moving platform from the start of the survey up to the given time moment t. The computed sensitivities may be assembled into a temporal sensitivity matrix S from the start of the survey up to the given time moment t.

As an example, the sensitivities may be evaluated using the quasi-Born method:

$$S(r',t) = \int_V \hat{G}_H(r',r) \cdot E(r,t) d^3r. \quad (8)$$

The volume integral of equation 8 can be evaluated for those cells within the EM system sensitivity domain for a given EM source and EM sensor pair from the start of the survey to a given time moment t. Even though a 3D earth model for an airborne EM survey may contain millions of cells, limiting numerical solutions of equation (8) to a sensitivity domain for a given EM source and EM sensor pair is tractable in real time. The matrix of volume integrated magnetic Green's functions for equation (8) is identical to the matrix of volume integrated magnetic Green's functions for equation (5) which may be pre-computed and stored prior to the survey.

FIGS. 11A-11H illustrate a synthetic example of real time volume imaging for a frequency-domain helicopter EM system of inductive sources and receivers. The original 3D earth model consists of two bodies. One of the bodies is of 50 m cubic dimension and 10 ohm-m resistivity, and is buried 50 m from the surface. The other body is of 100 m cubic dimension and 1 ohm-m resistivity, and is buried 100 m from the surface. Temporal volume images at depths of 50 m and 100 m are shown for different time moments in an EM survey corresponding to the completion of five, six, seven and eight EM survey lines. Note that the volume image evolves during the real time imaging of the EM data.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical non-transitory storage media. Computer-readable media that carry computer-executable instructions are transmission media. Thus, by way of example, and not limitation, embodiments of the invention can comprise at least two distinctly different kinds of computer-readable media: physical non-transitory storage media and transmission media.

Physical non-transitory storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for real time volume imaging of electrical conductivity of an examined medium from electromagnetic (EM) data measured from at least one moving platform, the method comprising:
   a. placing at least one physical EM source and/or physical EM sensor in at least one position on at least one moving platform and moving the moving platform from the start of a survey up to a given time moment t;
   b. measuring while the moving platform is moving at least one component of electric and/or magnetic field data with the at least one physical EM sensor in at least one receiving position on the moving platform along at least one survey line by the at least one moving platform from the start of the survey up to the given time moment t;
   c. computing predicted at least one component of EM data from the start of the survey up to the given time moment t by use of an initial 3D electrical conductivity model that is based on known information regarding the examined medium;
   d. calculating a temporal sensitivity for the EM data measured at the at least one physical EM sensor operating from the start of the survey up to the given time moment t using a perturbation of the electrical conductivity within the moving sensitivity domain of the physical EM source and physical EM sensor sensitivities of the at least one moving platform;
   e. comparing the computed predicted EM data with the EM data measured at the at least one physical EM sensor to determine an error value between the predicted EM data and the measured EM data;
   f. constructing a temporal 3D volume image of the electrical conductivity for the given time moment t when the error value is less than a predetermined threshold value by applying an iterative linearized inversion and/or migration with line search and/or preconditioning to the temporal EM data measured by the at least one moving platform from the start of the survey up to the given time moment t; and
   g. outputting the temporal 3D image,
   wherein when the error value is greater than the predetermined threshold value:
      the initial 3D electrical conductivity model is updated and an updated predicted at least one component of EM data is calculated;
      the updated predicted at least one component of EM data is compared with the EM data measured at the at least one physical EM sensor to determine an updated error value between the predicted EM data and the measured EM data; and
      the temporal 3D volume image is constructed when the updated error value is less than the predetermined threshold value.

2. The method of claim 1, wherein the electrical conductivity comprises one of conductivity, dielectric permittivity, and/or induced polarization parameters, representing the physical properties of the examined medium containing natural structures or man-made objects.

3. The method of claim 1, wherein the at least one physical EM sensor comprises a plurality of physical EM sensors arranged in an array.

4. The method of claim 3, wherein the plurality of physical EM sensors include inductive and/or galvanic and/or capacitive sensors.

5. The method of claim 1, wherein the physical EM sources may be controlled EM sources including man-made inductive sources and/or man-made galvanic sources located at at least one fixed position with respect to the at least one moving platform.

6. The method of claim 1, wherein the physical EM sources may be controlled EM sources including man-made inductive sources and/or man-made galvanic sources located on the at least one moving platform.

7. The method of claim 1, wherein the physical EM sources may be natural EM sources.

8. The method of claim 1, wherein the 3D modeling, inversion and/or migration of the EM data includes an algorithm based on a numerical solution of Maxwell's equations in either the frequency-domain or the time-domain including but not limited to semi-analytical, finite difference, finite element, boundary element, integral equation and/or hybrid numerical methods.

9. The method of claim 1, wherein the 3D modeling comprises of algorithms based on linear approximations.

10. The method of claim 1, wherein imaging is based on the inversion and/or migration comprised of
   a) an algorithm based on an iterative linearized method and/or line search and/or preconditioning technique;
   b) temporal sensitivities and/or their actions calculated implicitly and/or explicitly using adjoint operators;
   c) temporal sensitivities and/or their actions calculated implicitly and/or explicitly using linear approximations;
   d) an algorithm based on regularization including smooth and/or focusing stabilizers and/or combinations thereof;
   e) an algorithm based on a temporal moving sensitivity domain of the physical EM source and EM sensor sensitivities;
   f) an algorithm based using the initial 3D electrical conductivity model at the time moment $t_n$ may be constructed from in real time from the 3D electrical conductivity model at the time moment $t_{n-1}$.

11. The method of claim 1, wherein at least one moving platform is a vessel.

12. The method of claim 1, wherein at least one moving platform is a wireline device.

13. The method of claim 1, wherein at least one moving platform is a bottom hole assembly.

14. The method of claim 1, wherein at least one moving platform is an unattended aerial system.

15. The method of claim 1, wherein at least one moving platform is a helicopter.

16. The method of claim 1, wherein at least one moving platform is a fixed wing aircraft.

17. The method of claim 1, wherein at least one moving platform is an airship.

18. The method of claim 1, wherein at least one moving platform is a vehicle.

19. The method of claim 1, wherein the examined medium contains a geological structure.

20. The method of claim 1, wherein volume images for variations in the subsurface electrical conductivity may be obtained from time-lapsed surveys.

21. A physical non-transitory computer readable medium having stored thereon computer executable instructions that when executed by a processor cause a computing system to perform a method for rapid real time imaging of electrical conductivity from moving platforms using at least one physical EM source and/or physical EM sensor placed in at least one position on at least one moving platform, where the moving platform is moved from the start of a survey up to a given time moment t, the method comprising:
   a. measuring while the moving platform is moving at least one component of electric and/or magnetic field data with the at least one physical EM sensor in at least one receiving position on the moving platform along at least one survey line by the at least one moving platform from the start of the survey up to the given time moment t;
   b. computing predicted at least one component of EM data from the start of the survey up to the given time moment t by use of an initial 3D electrical conductivity model that is based on known information regarding an examined medium;
   c. calculating a temporal sensitivity for the EM data measured at the at least one physical EM sensor operating from the start of the survey up to the given time moment t using a perturbation of the electrical conductivity within the moving sensitivity domain of the physical EM source and physical EM sensor sensitivities of the at least one moving platform;
   d. comparing the computed predicted EM data with the EM data measured at the at least one physical EM sensor to determine an error value between the predicted EM data and the measured EM data;
   e. constructing a temporal 3D volume image of the electrical conductivity for the given time moment t when the error value is less than a predetermined threshold value by applying an iterative linearized inversion and/or migration with line search and/or preconditioning to the temporal EM data measured by the at least one moving platform from the start of the survey up to the given time moment t; and
   f. outputting the temporal 3D image,
   wherein when the error value is greater than the predetermined threshold value:
      the initial 3D electrical conductivity model is updated and an updated predicted at least one component of EM data is calculated;
      the updated predicted at least one component of EM data is compared with the EM data measured at the at least one physical EM sensor to determine an updated error value between the predicted EM data and the measured EM data; and
      the temporal 3D volume image is constructed when the updated error value is less than the predetermined threshold value.

22. A system for rapid real time imaging of electrical conductivity from moving platforms comprising:
   a moving platform;
   at least one physical EM source and/or physical EM sensor configured to generate and/or measure one component of electric and/or magnetic field data, wherein the at least one physical EM source and/or physical EM sensor are positioned on the moving platform; and
   a computing system comprising:
      a processor;
      one or more physical non-transitory computer readable medium having computer executable instructions stored thereon that when executed by the processor, cause the computing system to perform the following:
         a. measure while the moving platform is moving at least one component of electric and/or magnetic field data with the at least one physical EM sensor in at least one receiving position on the moving platform along at least one survey line by the at least one moving platform from the start of the survey up to the given time moment t;
         b. compute predicted at least one component of EM data from the start of the survey up to the given time moment t by use of an initial 3D electrical conductivity model that is based on known information regarding the examined medium;
         c. calculate a temporal sensitivity for the EM data measured at the at least one physical EM sensor operating from the start of the survey up to the given time moment t using a perturbation of the electrical conductivity within the moving sensitivity domain of the physical EM source and physical EM sensor sensitivities of the at least one moving platform;
         d. compare the computed predicted EM data with the EM data measured at the at least one physical EM sensor to determine an error value between the predicted EM data and the measured EM data;
         e. constructing a temporal 3D volume image of the electrical conductivity for the given time moment t when the error value is less than a predetermined threshold value by applying an iterative linearized inversion and/or migration with line search and/or preconditioning to the temporal EM data measured by the at least one moving platform from the start of the survey up to the given time moment t; and
         f. outputting the temporal 3D image,
      wherein when the error value is greater than the predetermined threshold value:
         the initial 3D electrical conductivity model is updated and an updated predicted at least one component of EM data is calculated;
         the updated predicted at least one component of EM data is compared with the EM data measured at the at least one physical EM sensor to determine an updated error value between the predicted EM data and the measured EM data; and the temporal 3D volume image is constructed when the updated error value is less than the predetermined threshold value.

* * * * *